J. LEVOY & A. FRIED.
COMBINATION BABY CARRIAGE AND CRADLE.
APPLICATION FILED SEPT. 23, 1912.
1,101,458.
Patented June 23, 1914.
2 SHEETS—SHEET 1.
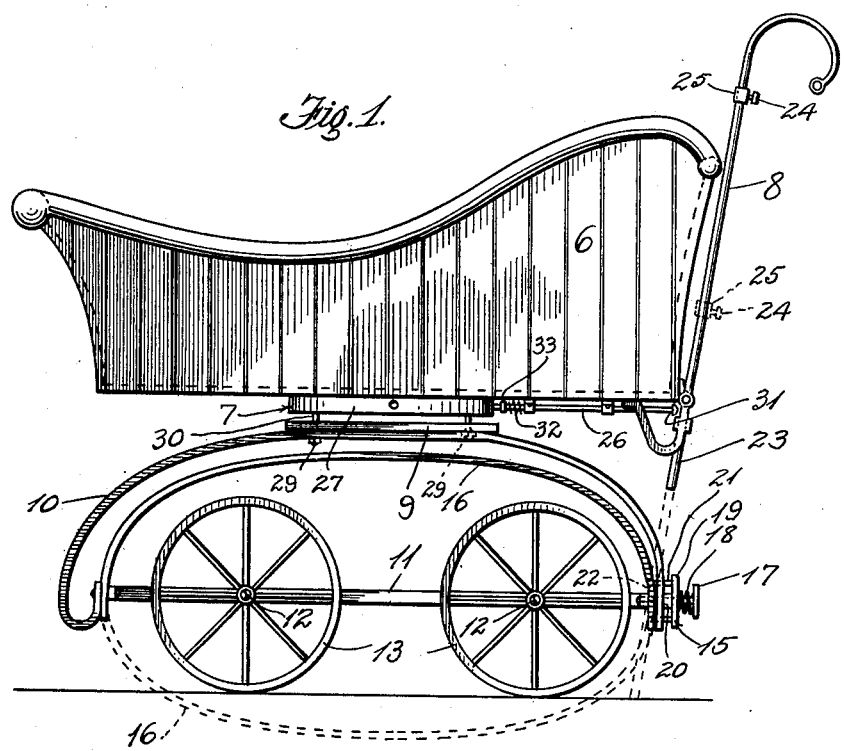
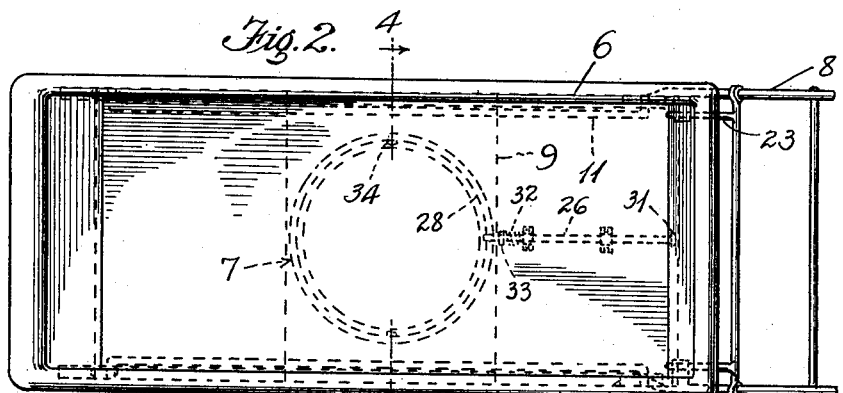
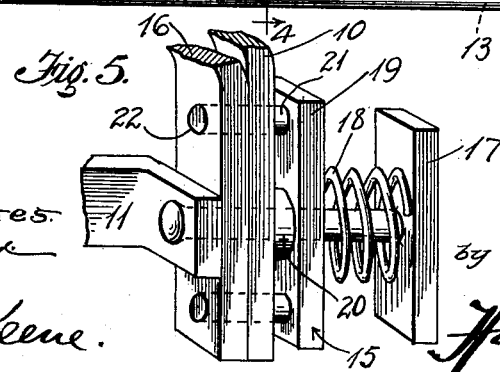
Witnesses
E. R. Pollard
W. T. Keene.
Inventors
Joe Levoy and
Armin Fried.
by
Harvard & Mause
Attys.

J. LEVOY & A. FRIED.
COMBINATION BABY CARRIAGE AND CRADLE.
APPLICATION FILED SEPT. 23, 1912.
1,101,458.
Patented June 23, 1914.
2 SHEETS—SHEET 2.
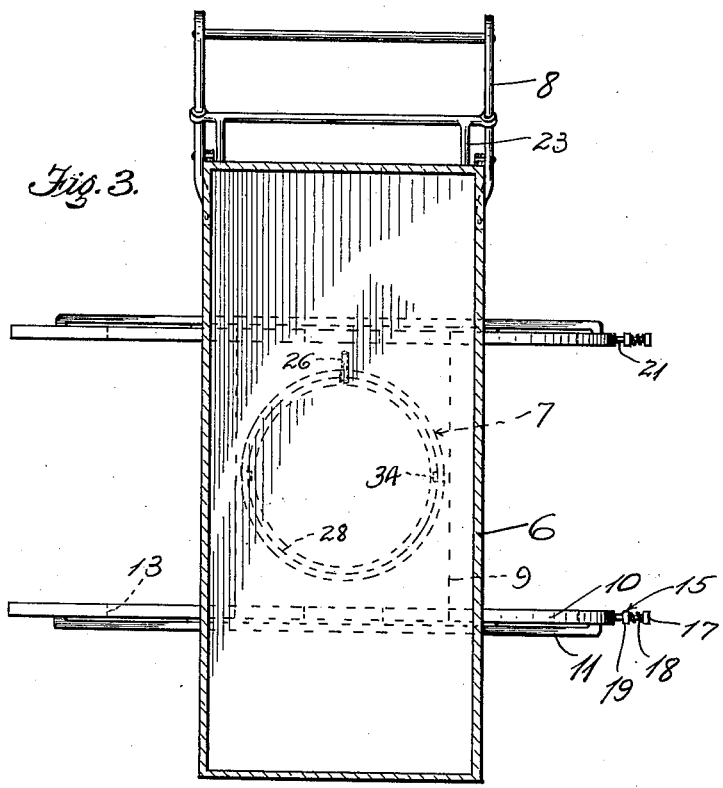
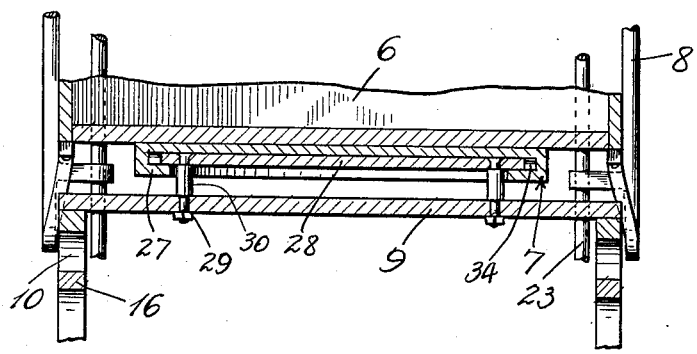
Witnesses
Inventors
Joseph Levoy and
Armin Fried.

UNITED STATES PATENT OFFICE.

JOE LEVOY AND ARMIN FRIED, OF LOS ANGELES, CALIFORNIA.

COMBINATION BABY-CARRIAGE AND CRADLE.

1,101,458.      Specification of Letters Patent.      Patented June 23, 1914.

Application filed September 23, 1912. Serial No. 721,812.

*To all whom it may concern:*

Be it known that we, JOE LEVOY and ARMIN FRIED, citizens of Austria-Hungary, residing at Los Angeles, in the county of Los Angeles and State of California, have invented a new and useful Improvement in a Combination Baby-Carriage and Cradle, of which the following is a specification.

This invention relates to baby carriages, and particularly to baby carriages adapted to be converted into other articles of furniture, and the principal object is to convert a baby carriage into a cradle.

It is also an object to lift the carriage off of the wheels and provide rockers that may also be used to convert the body of the carriage to a rocking chair as well as locking the body, converting the whole into a stationary chair.

In the drawings accompanying this specification: Figure 1 is a side elevation of the carriage showing it mounted upon the wheels for use as a carriage, the rocking position of the rockers being shown in dotted lines. Fig. 2 is a plan view of the carriage as in Fig. 1. Fig. 3 is a plan view of the device in position to be used as a cradle. Fig. 4 is a cross section on the line 4—4 through the turn table looking in the direction of the arrows. Fig. 5 is a perspective detail of the locking bolt to hold the rockers in operative or inoperative position.

More specifically in the drawings like numerals indicate the same parts in the different views, 6 designating the body of the carriage rigidly secured to the turn table 7 and provided with the handle bars 8. The turn table is pivotally mounted upon the frame 9 to which are secured the springs 10, these in turn being secured to the wheel frame 11 carrying the short axles 12 on which are mounted the wheels 13, a pair on each wheel frame.

The connections between the spring 10 and the wheel frame 11 are rigid, one of the securing bolts 15 on the rear end being carried rearwardly and outwardly through the curved rocker 16 and provided with the headed extension 17 against which bears one end of the spring 18. The rocker 16 is hinged on this pin and is held in positive relation to the springs and the body frame by the locking mechanism which consists of the block 19 supported by the sleeve 20 on the bolt 15.

The locking block 19 is provided with the two studs 21 which register with and project through the central bores 22 carried through the springs 10 and the rocker 16. These bores are so arranged that they register when the rocker is in vertical position in the same plane with the plane of the springs and above the wheels, and by the drawing of these bolts, the rocker may be swung down and engaged when it is in the same vertical plane and below the tread of the wheels, and openings 22 being the same distance from the pivot point. With the body 6 in the normal position as in Fig. 1, this converts the structure into a rocking chair, or if it is desired to prevent this rocking movement, the sliding stop 23 mounted on the handle bars 8 may be dropped to its lowered position as shown in the dotted lines in Fig. 1. By taking up the nut 24 in the socket 25, mounted on the rods 23, the movement of the converted chair in positively prevented.

To convert the structure into a cradle, the body 6 is swung to a position transversely to the frame 9, after the stop 23 is lifted to its normal position and locked as shown in Fig. 1. To accomplish the transverse movement the turn table is released by withdrawing the spring actuated bolt 26 from its locking position. The turn table consists of a metallic plate 7 secured to the bottom of the frame body 6 provided with the flanged ring 27 which embraces the fifth wheel or pivot plate 28. This plate is securely fastened to the frame 9 by the bolts 29, these bolts being so placed in connection with the spacing sleeves 30 that the pivot plate 28 is rigidly secured to allow movement of the turn table 7 thereon. The locking bolt 26 is shown as a rod of sufficient length to extend from its bearings in the turn table to the rearward end of the body where it is provided with a handle 31. A suitable spring bearing on the stud 33 on the bolt, normally throws it in engagement with the bolt sockets 34 cut in the pivot plate 28 which are placed at angles of 90° on the plate. It will thus be seen by withdrawing the rod 26 from the bolt sockets 34, the body may be turned to an angle of 90° on either side, when the bolt will automatically engage with the opening in the plate 28, and the device is in position to use as a cradle.

What we claim is:

1. A combined baby carriage and cradle, comprising a body member pivotally mounted on a wheel base, a wheel base provided with wheels, a curved rocker pivotally mounted on said wheel base, and means to lock said rocker in operative or inoperative position.

2. A combined baby carriage and rocker, comprising a body member, a wheel base member, wheels revolubly mounted thereon, pivotal connections interposed between said members, a pivoted cradle rocker connected at each of its ends to said wheel base member, and locking means to lock said rocker in operative position below said wheels.

3. A combined baby carriage and cradle, comprising a body member, a turn table secured to said body, a pivot plate embraced by said turn table, locking means secured to said turn table, a wheel base secured to said pivot plate, and a sliding stop to engage the ground secured to said body portion whereby movement of the vehicle is prevented.

In witness that we claim the foregoing we have hereunto subscribed our names this 14th day of Sept., 1912.

JOE LEVOY.
ARMIN FRIED.

Witnesses:
W. P. KEENE,
EARLE R. POLLARD.

---

Copies of this patent may be obtained for five cents each, by addressing the "Commissioner of Patents, Washington, D. C."